Sept. 21, 1926.  
D. C. KENYON ET AL  
1,600,765  
HOSE COUPLING  
Filed April 20, 1926
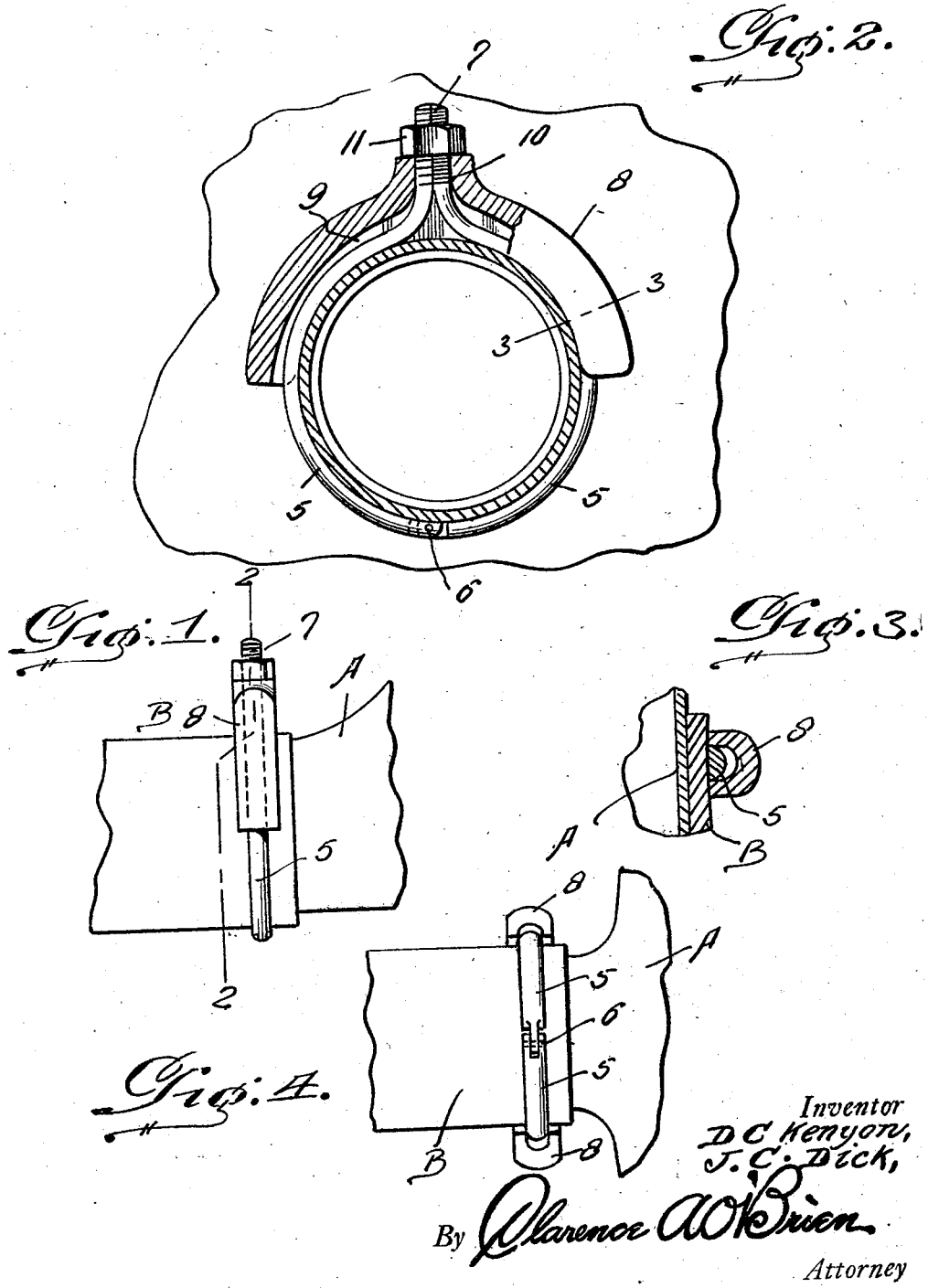

Patented Sept. 21, 1926.

1,600,765

UNITED STATES PATENT OFFICE.

DANIEL C. KENYON AND JOHN G. DICK, OF CHINOOK, MONTANA.

HOSE COUPLING.

Application filed April 20, 1926. Serial No. 103,284.

This invention relates to hose couplings for facilitating the connection in a water tight manner of a flexible hose to the nipple of an automobile radiator or in fact to any metallic nipple when it is desired to attach a flexible hose thereto. The coupling is also well adapted for use in clamping a packing around an iron pipe and in fact for a number of uses not necessary to be mentioned herein.

The primary object of the invention is to substantially improve and simplify hose couplings of this general character.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:

Figure 1 is a side elevation of our improved hose coupling, in this instance employed for the water proof attachment of a hose section to the nipple of an automobile radiator.

Figure 2 is an enlarged detail vertical section taken substantially upon the line 2—2 of Figure 1, disclosing the coupling partly in side elevation and partly in cross section.

Figure 3 is a detail transverse section taken substantially upon the line 3—3 of Figure 2 and Figure 4 is a bottom plan view of the coupling as disclosed in Figure 1.

In the drawing A designates the nipple of an automobile radiator over which is arranged one end of a flexible hose B, it being of couse understood that no such limitation is placed upon the use of the present coupling as such particular use is merely disclosed by way of illustration. The coupling per se constitutes the provision of a pair of semi-circular shaped ring sections 5—5 that are semi-circular shaped in cross section as disclosed in Figure 3, in order that the flat sides thereof will have flush engagement with the hose B in the clamping of the same upon the nipple A. Certain ends of these sections are pivotally interconnected as at 6 while the opposite ends thereof are bent outwardly at substantially right angles with respect to the sections to provide a bolt 7 when said ends are brought together as in Figure 2, these ends being externally screw threaded as also disclosed in this figure.

The coupling further constitutes the provision of a semi-circular shaped head 8 that is formed at its under side with a wide and deep channel 9 within which the ring sections 5—5 will fit, Figures 2 and 3. Intermediate the ends of this head the same is formed with a bossed opening 10 through which the bolt forming ends of the ring sections engage after which a locking nut 11 is threaded thereon. By turning downwardly upon this nut the ends of the ring sections will be drawn through the opening for firmly binding the sections and the head upon the hose for providing a water tight connection between the hose and the nipple B and A respectively.

It will thus be seen that we have provided a highly novel, simple and efficient form of hose coupling that is well adapted for all the purposes heretofore designed, and even though we have herein shown and described the same as consisting of certain detail structural elements, it is nevertheless to be understood that minor changes may be made without affecting the spirit and scope of the appended claims.

Having thus described the invention, what we claim as new and desire to secure by Letters Patent is:—

1. In a hose coupling of the class described, a pair of pivotally connected semi-circular ring sections, the free ends of said sections being bent outwardly in abutting relation, a substantially semi-circular clamping head formed at its under side with a channel for receiving said ring like section at a point opposite the pivotal connection of said sections, said head being formed with an opening through which the abutting free ends of the sections extend, and means for drawing the ends through the openings for clamping the sections and heads upon a pipe joint.

2. In a hose coupling of the class described, a pair of pivotally connected semi-circular ring sections, the free ends thereof being disposed outwardly in abutting relation, a clamping head engaged over the ring sections at a point opposite from the pivotal connection, said heads being formed with an opening through which the abutting free ends of the sections extend, and means for drawing the ends through the opening for clamping the sections and head upon a pipe joint.

3. In a hose coupling of the class described, a ring-like member, the free ends thereof being disposed outwardly and being externally threaded, the inner opposed faces of the threaded free ends being flattened and arranged in abutting relation to form a bolt, a semi-circular clamping head engaged over the ring-like member, the intermediate portion of said head being provided with an opening through which the bolt forming ends of the ring-like member extends, and a nut threaded on the threaded end and cooperating with the clamping head for clamping the ring-like member and the head upon a pipe joint.

In testimony whereof we affix our signatures.

DANIEL C. KENYON.
JOHN G. DICK.